United States Patent
Chou et al.

(10) Patent No.: US 11,381,942 B2
(45) Date of Patent: Jul. 5, 2022

(54) PLAYBACK SYSTEM AND METHOD

(71) Applicant: REALTEK SEMICONDUCTOR CORPORATION, Hsinchu (TW)

(72) Inventors: Kai-Hsiang Chou, Hsinchu (TW); Po-Hsin Luo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/023,427

(22) Filed: Sep. 17, 2020

(65) Prior Publication Data

US 2021/0105592 A1    Apr. 8, 2021

(30) Foreign Application Priority Data

Oct. 3, 2019   (TW) ................. 108135912

(51) Int. Cl.
*H04W 4/33*    (2018.01)
*H04W 4/029*   (2018.01)
(Continued)

(52) U.S. Cl.
CPC .............. *H04W 4/33* (2018.02); *G06F 3/165* (2013.01); *H04W 4/029* (2018.02); *H04W 4/80* (2018.02); *H04W 8/24* (2013.01)

(58) Field of Classification Search
CPC ......... H04W 4/33; H04W 4/029; H04W 4/80; H04W 8/24; H04W 4/023; G06F 3/165
(Continued)

(56) References Cited

U.S. PATENT DOCUMENTS 9,052,802 B2   6/2015   Yu et al.
9,357,309 B2   5/2016   Meyer et al.
(Continued)

FOREIGN PATENT DOCUMENTS

CN   106162444 A   * 11/2016
CN   106162444 A     11/2016
(Continued)

OTHER PUBLICATIONS

OA letter of the TW application (appl. no. 108135911) dated Sep. 15, 2020. Summary of the OA letter: Claims 1-10 are rejected as being unpatentable over the cited reference 1 (US 2015/0095170A1) and the cited reference 2 (US 2004/0166850A1).
(Continued)

*Primary Examiner* — Hirdepal Singh
(74) *Attorney, Agent, or Firm* — WPAT, PC

(57) ABSTRACT

Disclosed is a playback system including a master device and slave devices. The master device executes the following steps: selecting data for playback; obtaining the position information of the slave devices through a wireless positioning technique; ascertaining a distribution pattern according to the position information; comparing the distribution pattern with at least a part of the patterns of multiple predetermined modes and thereby selecting one from the predetermined modes as a playback mode; and determining the playback parameters of the slave devices according to the position information and the playback mode, or notifying the slave devices of their playback roles based on the playback mode and the position information to let the slave devices determine their own playback parameters. Each slave device includes a wireless communication circuit available to the wireless positioning technique, and the slave devices play synchronously according to the master device's control.

10 Claims, 12 Drawing Sheets

(51) Int. Cl.
*H04W 4/80* (2018.01)
*H04W 8/24* (2009.01)
*G06F 3/16* (2006.01)

(58) Field of Classification Search
USPC ...................................................... 455/456.1
See application file for complete search history.

(56) References Cited

U.S. PATENT DOCUMENTS

| | | |
|---|---|---|
| 2004/0166850 A1 | 8/2004 | Backes |
| 2008/0253577 A1 | 10/2008 | Eppolito |
| 2011/0002487 A1 | 1/2011 | Panther et al. |
| 2011/0213901 A1 | 9/2011 | Rostaing et al. |
| 2012/0159011 A1 | 6/2012 | Rostaing et al. |
| 2012/0170758 A1 | 7/2012 | Eppolito |
| 2012/0189140 A1 | 7/2012 | Hughes |
| 2012/0310393 A1 | 12/2012 | Stewart et al. |
| 2013/0191625 A1 | 7/2013 | Mullens et al. |
| 2013/0227179 A1 | 8/2013 | Kalayjian et al. |
| 2014/0109138 A1 | 4/2014 | Cannistraro et al. |
| 2015/0095170 A1 | 4/2015 | Lang |
| 2015/0195590 A1* | 7/2015 | McCoy ............ H04N 21/44209 725/28 |
| 2015/0295982 A1* | 10/2015 | Kafle ..................... H04L 69/18 709/219 |
| 2021/0084431 A1* | 3/2021 | Reilly ..................... H04S 7/303 |
| 2021/0194944 A1* | 6/2021 | Girardier ............ H04L 65/4023 |

FOREIGN PATENT DOCUMENTS

| | | | |
|---|---|---|---|
| CN | 106488289 A | * | 3/2017 |
| CN | 106488289 A | | 3/2017 |
| WO | WO2015067732 A1 | | 5/2015 |

OTHER PUBLICATIONS

OA letter of the counterpart TW application (appl. no. 108135912) dated Nov. 27, 2020. Summary of the OA letter: Claims 1-7 and 9-10 are rejected as being unpatentable over the cited reference 1 (CN 106162444 A) in view of the cited reference 2 (CN 106488289 A).

OA letter of a (U.S. Appl. No. 17/016,433) dated Feb. 8, 2022.

\* cited by examiner

PLAYBACK SYSTEM AND METHOD

BACKGROUND OF THE INVENTION

1. Field of the Invention

The present disclosure relates to a playback system and method, especially to a playback system and method using the position information of playback devices to determine playback parameters of the playback devices.

2. Description of Related Art

A wireless playback system (e.g., wireless audio system) usually includes a host and a plurality of wireless accessory devices (e.g., Bluetooth/Wi-Fi speakers). These wireless accessory devices are set within a wireless signal range and configured to process specific network data (e.g., music broadcasted from an internet radio) according to the setting of the host. If any of the wireless accessory devices is moved out of the wireless signal range, this wireless accessory device will not process the specific network data anymore.

On the basis of the above, in a circumstance that the wireless accessory devices are assigned different playback roles (e.g., front-left speaker, front-right speaker, rear-left speaker, rear-right speaker, etc.) according to their positions, if one of these wireless accessory devices is moved after its playback role is determined and this wireless accessory device is still within the wireless signal range after the movement, the role assigned to this wireless accessory device should better be redetermined according to its current position. However, the conventional techniques do not redetermine the role of a wireless accessory device after its position is changed.

SUMMARY OF THE INVENTION

An object of the present disclosure is to provide a playback system and method as improvements over the prior art.

An embodiment of the playback system of the present disclosure includes a master device and a plurality of slave devices. The master device is configured to perform a plurality of steps including: selecting data for playback; actively/passively obtaining position information of slave devices, in which the position information of the slave devices is determined with a wireless positioning technique; obtaining a distribution pattern according to the position information of the slave devices; comparing the distribution pattern with at least a part of patterns of multiple predetermined modes and thereby selecting one from the predetermined modes as a playback mode; and determining playback parameters of the slave devices according to the position information of the slave devices and the playback mode so as to determine an effect of the slave devices processing the data, or notifying each of the slave devices of its playback role that is determined according to the playback mode and the position information of the slave devices so that each of the slave devices determine its own playback parameter(s). Each of the slave devices includes a wireless communication circuit available to the wireless positioning technique, and the slave devices process the data synchronously according to the master device's control.

An embodiment of the playback method of the present disclosure is carried out by a master device. This embodiment includes the following steps: selecting data for playback; actively/passively obtaining position information of slave devices, wherein the position information of the slave devices is determined with a wireless positioning technique; obtaining a distribution pattern according to the position information of the slave devices; comparing the distribution pattern with at least a part of patterns of multiple predetermined modes and thereby selecting one from the predetermined modes as a playback mode; determining playback parameters of the slave devices according to the position information of the slave devices and the playback mode so as to determine an effect of the slave devices processing the data, or notifying each of the slave device of its playback role that is determined according to the playback mode and the position information of the slave devices; and controlling the slave devices to process the data synchronously.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

A lot of portable playback devices (e.g., wireless speakers, wireless monitors, cellphones, tablet computers, wireless earphones, etc.) are equipped with central processing units (CPUs) and have network capability. Providing these portable playback devices obtain a Uniform Resource Locator (a.k.a. web address), these playback devices themselves as a whole are capable of functioning as an independent playback system for playing music, video, or other content related to the URL. However, if these playback devices are moved out of their current network range, the conventional arts do not enable them to continue playing; in addition, after the positions of these playback devices are changed, the conventional arts do not allow the playback roles assigned to these playback devices to be redetermined in view of their current positions. In light of the above problems of the prior arts, the present disclosure discloses a network data playback system and method allowing a playback device to continue processing content related to the latest URL after the playback device is moved out of the original network range the playback device used for playing. Besides, the present disclosure also discloses a playback system and method allowing one or more playback devices to change its/their role(s) for playing after its/their positions are changed (e.g., to exchange the roles of a left channel earphone and a right channel earphone of a Bluetooth headsets after the positions of the two earphones are exchanged). In consideration of positioning accuracy and application circumstances, a known or self-developed indoor/outdoor positioning technique can directly/indirectly be introduced to the present disclosure for determining the position of a playback device; for example, the positioning technique can be a known or self-developed Wi-Fi positioning technique having a positioning error within two meters, a known or self-developed Bluetooth positioning technique having a positioning error within one meter, or a known or self-developed ultra-wideband (UWB) positioning technique having a positioning error within 1~2 centimeters. Several positioning techniques are found in the following websites:

(1) https://kknews.cc/zh-tw/tech/2bznyr.html;
(2) https://arxiv.org/pdf/1709.01015.pdf;
(3) https://en.wikipedia.org/wiki/Wi-Fi_positioning_system;
(4) https://www.leverege.com/blogpost/wifi-indoor-positioning;
(5) https://pdfs.semanticscholar.org/8e72/61a54be0cdc66b15b111046057859b9c88eb.pdf; and
(6) https://benevo.pixnet.net/blog/post/66881109-.

Since positioning techniques themselves are beyond the discussion scope of the present disclosure, their detail is omitted here.

Figure 1:
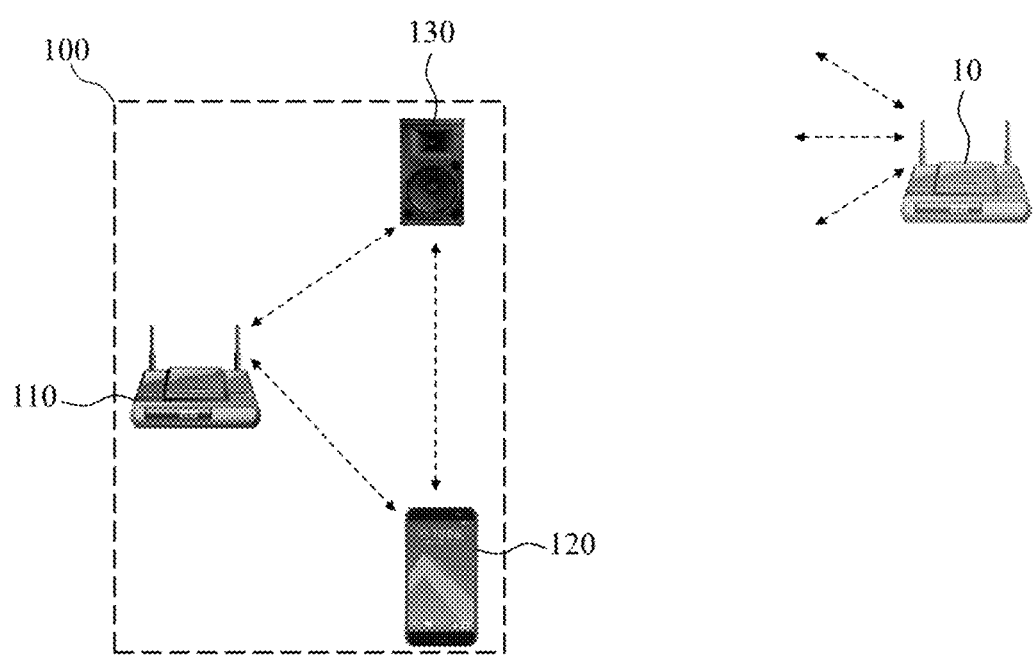
FIG. 1 shows an embodiment of the network data playback system of the present disclosure.

FIG. 1 shows an embodiment of the network data playback system of the present disclosure. The network data playback system 100 of FIG. 1 includes a first network circuit 110, a master device 120, and a first slave device 130. For example, the network data playback system 100 uses a known network configuration such as a mesh Wi-Fi configuration; the first network circuit 110 is included in/attached to a device having network capability such as a Wi-Fi access point, a wireless network switch, or a cellphone/tablet computer; the master device 120 is a playback control device (e.g., host capable of control a slave device to play music and/or video) such as a cellphone/portable computer/wireless audio system/wireless video projecting device; and the first slave device 130 is a playback device (e.g., device capable of playing music and/or video) such as a cellphone/portable wireless speaker/monitor. Those having ordinary skill in the art can derive more examples from the above disclosure. It should be noted that the appearance of each device/circuit in the figures of the present application is for the explanation of the embodiments of the present disclosure rather than the limitation to the scope of the present invention.

Please refer to FIG. 1. The first network circuit 110 is a known or self-developed circuit capable of accessing network resources (e.g., resources on the Internet) directly/indirectly; the first network circuit 110 is configured to provide the accessed network resources (e.g., sound data and/or image data) for the master device 120 and the first slave device 130. The first network circuit 110 can be a part of the master device 120 in light of the design or application circumstances, or it can be independent of the master device 120. Since network communication techniques are beyond the discussion scope of the present disclosure, their detail is omitted here.

Please refer to FIG. 1. The master device 120 can select data (e.g., audio/image data or multimedia data) of a URL through the first network circuit 110 and then actively/passively provides the URL for the first slave device 130. In an exemplary implementation, the master device 120 connects to the first network circuit 110 in a wired manner (e.g., Ethernet) or wireless manner (e.g., Wi-Fi) to access network resources. In an exemplary implementation, the master device 120 provides the URL for the first slave device 130 in a wired/wireless manner directly without the intervention of any third party (e.g., the first network circuit); in a circumstance that the master device 120 provides the URL for the first slave device 130 in a wired manner, the positions of the master device 120 and the first slave device 130 are usually fixed or can be moved in a quite limited range while the first network circuit 110 may be included in or attached to a portable device so that the distance between the first slave device 130 and the first network circuit 110 may vary. In an exemplary implementation, when the master device 120 connects to the first slave device 130 the first time, the master device 120 transmits the URL to the first slave device 130; when the master device 120 selects or is redirected to a new URL (i.e., an updated URL), the master device 120 transmits the updated URL to the first slave device 130. In an exemplary implementation, the master device 120 actively transmits the URL and/or information of the current progress (e.g., elapsed time/remaining time) of the master device's processing the data related to the URL for the first slave device 130 many times periodically/non-periodically. In an exemplary implementation, the master device 120 passively transmits the URL and/or information of the current progress for the first slave device 130 in response to the request from the first slave device 130; for example, if a first estimated distance is longer than a first threshold as mentioned in a later paragraph, the first slave device 130 actively requests the master device 120 to transmit the URL and/or information of the current progress for the first slave device 130. In an exemplary implementation, the master device 120 actively/passively provides the current progress (e.g., elapsed time/remaining time) of the master device's processing the data related to the URL for the first slave device 130. In an exemplary implementation, the master device 120 itself is a playback device (e.g., device for playing music and/or video).

Figure 2:
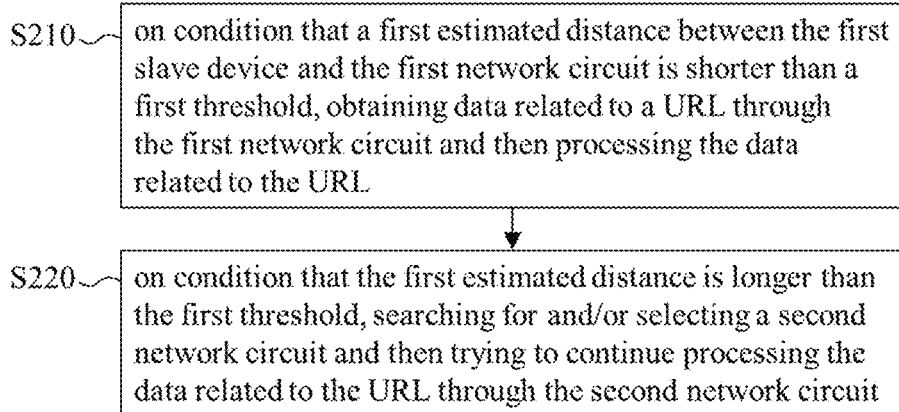
FIG. 2 shows an embodiment of the steps executed by the first slave device of FIG. 1.

Please refer to FIG. 1. The first slave device 130 is configured to execute a plurality of steps as shown in FIG. 2. The plurality of steps includes:

Step S210: on condition that a first estimated distance between the first slave device 130 and the first network circuit 110 is shorter than a first threshold, obtaining data related to the URL through the first network circuit 110 and then processing the data related to the URL. In an exemplary implementation, the first estimated distance is measured with the aforementioned positioning technique. In an exemplary implementation, the first network circuit 110 includes a wireless network circuit, the first slave device 130 includes a wireless communication circuit, at least one of the wireless signal of the wireless network circuit and the wireless signal of the wireless communication circuit is used for measuring the first estimated distance; for example, the first slave device 130 receives the wireless signal of the first network circuit 110 and measures the first estimated distance according to the strength of the wireless signal with a known or self-developed algorithm. In an exemplary implementation, the step for processing the data related to the URL includes: processing the data related to the URL in conjunction with the master device 120 under the control (e.g., play/pause/ fast-forward/next) from the master device 120, wherein the master device 120 controls the progress in processing the data and may optionally include a visual and/or acoustic device (e.g., speaker and/or screen). In an exemplary implementation, the first slave device 130 can process the data independently after it is informed of the URL, or the first slave device 130 and another slave device (e.g., second slave device as mentioned in a later paragraph) process the data synchronously under the same playback rule; in the meantime, the control from the master device 120 is not necessary.

Step S220: on condition that the first estimated distance is longer than the first threshold, searching for and/or selecting a second network circuit (e.g., the second network circuit 10 of FIG. 1) and then trying to continue processing the data related to the URL through the second network circuit. In an exemplary implementation, on condition that the first estimated distance is longer than the first threshold, even though the connection between the first network circuit 110 and the first slave device 130 remains alive, the connection quality may be poor; meanwhile, providing an estimated distance between the first slave device 130 and the second network circuit is shorter than the first estimated distance, the first slave device 130 can optionally choose the second network circuit to try to continue processing the data related to the URL. In an exemplary implementation, the first estimated distance is a weighted distance proportional to the rising rate of the first estimated distance; in other words, this weighted distance is proportional to the relative speed of the first slave device 130 leaving the first network circuit 110; therefore, the first slave device 130 can search for and/or select the second network circuit before the real distance between the first slave device 130 and the first network circuit 110 reaches the first estimated distance. In an exemplary implementation, on condition that the first slave device 130 continues processing the data related to the URL through the second network circuit, the first slave device 130 automatically adjusts at least one of its own parameters according to its capability (e.g., predetermined/optimal decoding setting and/or playback capability) or predetermined setting.

Figure 3:
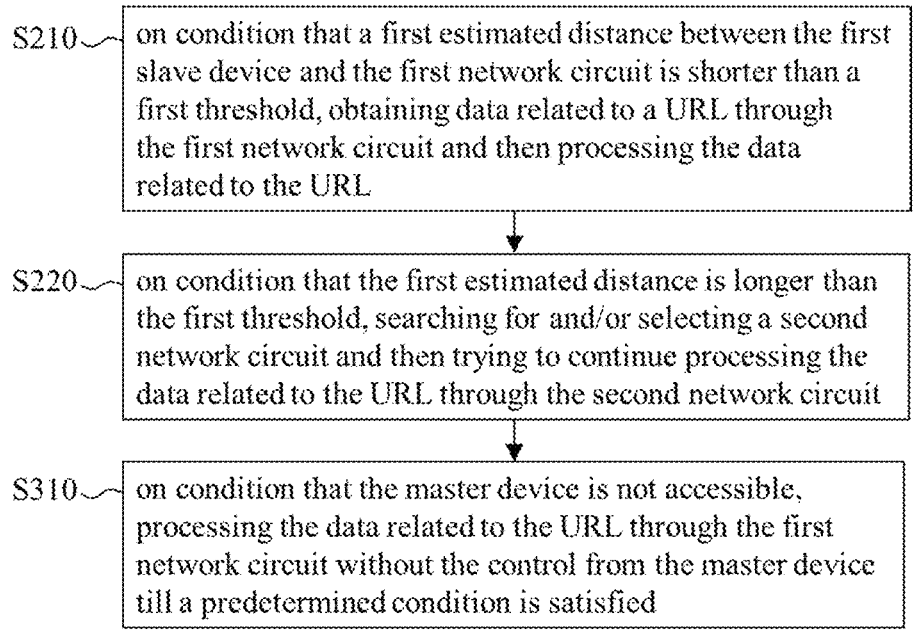
FIG. 3 shows the steps of FIG. 2 and a step optionally executed by the first slave device of FIG. 1.

Please refer to FIG. 1. The first slave device 130 can optionally execute the following step as shown in FIG. 3:

Step S310: on condition that the master device 120 is not accessible, processing the data related to the URL through the first network circuit 110 without the control from the master device 120 till a predetermined condition is satisfied. Examples of the predetermined condition are as follows: the first slave device 130 finishing playing a current song/episode that is played before the master device 120 becomes unaccessible; the first slave device 130 finishing playing all songs/episodes on the list; and another master device taking over the control of the first slave device 130.

Please refer to FIG. 1. The first slave device 130 can optionally provide its capability information (e.g., decoding capability and/or playback capability) for the master device 120 actively/passively so that the master device 120 can determine at least one playback parameter of the first slave device 130 (e.g., the setting of left and right sound channels, enhancement/fading setting on high/low frequency sound, setting of volume, etc.) for processing the data related to the URL and thereby determine the playback effect of the first slave device 130. In an exemplary implementation, the first slave device 130 is used for playing video data and its capability information is video decoding capability information in the form Four-Character Codes (FourCC); if the first slave device 130 does not or cannot provide FourCC, the master device 120 can consider that the first slave device 130 is incapable of decoding video data; and the above-mentioned video decoding capability information can optionally include resolution information (e.g., image width/height), video information (e.g., 5.1 sound channels and/or high dynamic range video (HDR); frame rate (fps); bit rate (Mbps)), etc. If the first slave device 130 does not or cannot provide some of the aforementioned video decoding capability information, the master device 120 can treat some maximum setting or predetermined setting of the video decoding capability as the missing part of the video decoding capability information. In an exemplary implementation, the first slave device 130 is used for playing video data and its capability information is video playback capability information such as the Extended Display Identification Data version 2.0 (EDID 2.0).

In an exemplary implementation, the first slave device 130 is used for playing audio data and its capability information is audio decoding capability information in the form Two-Character Codes (twoCC); if the first slave device 130 does not or cannot provide twoCC, the master device 120 can consider that the first slave device 130 is incapable of decoding audio data; and the above-mentioned audio decoding capability information can optionally include the EDID 2.0, number of channels, bit rate (Kbps)), sampling rate, etc. If the first slave device 130 does not or cannot provide some of the aforementioned audio decoding capability information, the master device 120 can treat some maximum setting or predetermined setting of the audio decoding capability as the missing part of the audio decoding capability information. In an exemplary implementation, the first slave device 130 is used for playing audio data and its capability information is audio playback capability information such as the number of speakers and frequency response information (e.g., the optimal frequency response range information and/or the complete frequency response information). If the first slave device 130 does not or cannot provide the number of speakers, the master device 120 can treat a predetermined number (e.g., one) as the number of speakers. If the first slave device does not or cannot provide the frequency response information, the master device 120 can treat predetermined frequency response information as the frequency response information of the first slave device 130.

Figure 4:
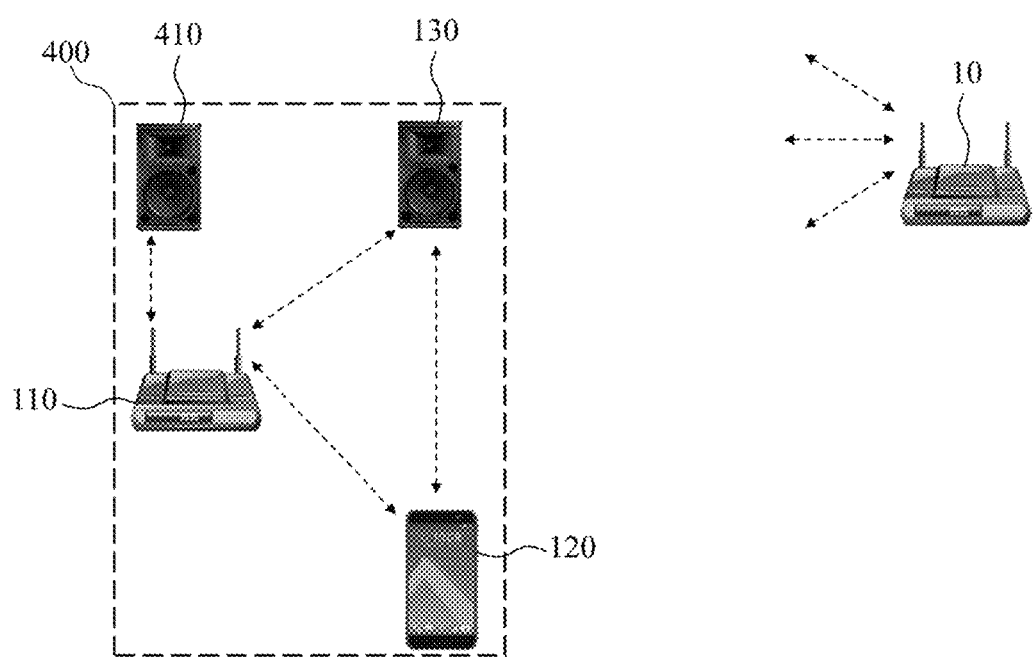
FIG. 4 shows another embodiment of the network data playback system of the present disclosure.

FIG. 4 shows another embodiment of the network data playback system of the present disclosure. Compared with FIG. 1, the network data playback system 400 of FIG. 4 further includes a second slave device 410. The operation and features of the second slave device 410 are similar to or the same as those of the first slave device 130, and thus the way to modify or improve the first slave device 130 can adequately be applied to the second slave device 410. It should be noted that the positions of different slave devices and the capabilities thereof (e.g., decoding capabilities and/or playback capabilities) may be different; and each slave device cooperates with the first network circuit 110 and the master device 120 in accordance with its own position and capability; accordingly, the upper limit of the connection distance between one slave device and the first network circuit 100 may be different from the upper limit of the connection distance between another one slave device and the first network circuit 100, and the playback parameter(s) of one slave device may be different from the playback parameter(s) of another one slave device.

Figure 5:
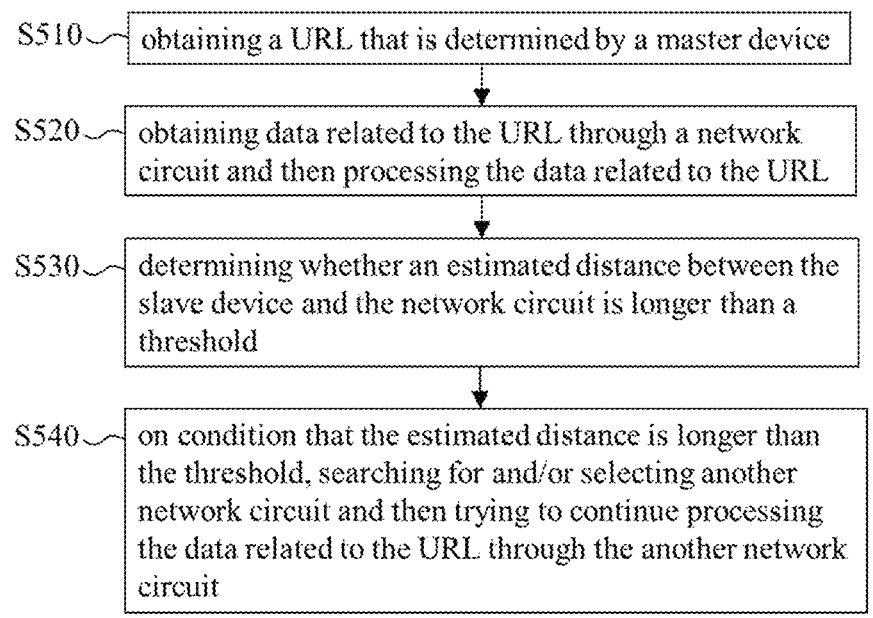
FIG. 5 shows an embodiment of the network data playback method of the present disclosure.

FIG. 5 shows an embodiment of the network data playback method of the present disclosure. This embodiment is executed by a slave device (e.g., the slave device 130 of FIG. 1) and includes the following steps:

Step S510: obtaining a URL that is determined by a master device (e.g., the master device 120 of FIG. 1);

Step S520: obtaining data related to the URL through a network circuit (e.g., the first network circuit 110 of FIG. 1) and then processing the data related to the URL;

Step S530: determining whether an estimated distance between the slave device and the network circuit is longer than a threshold; and Step S540: on condition that the estimated distance is longer than the threshold, searching for and/or selecting another network circuit (e.g., the second network circuit 10 of FIG. 1) and then trying to continue processing the data related to the URL through the another network circuit.

Since those having ordinary skill in the art can refer to the embodiments of FIGS. 1-4 to appreciate the detail and modifications of the embodiment of FIG. 5, repeated and redundant description is omitted here.

Figure 6:
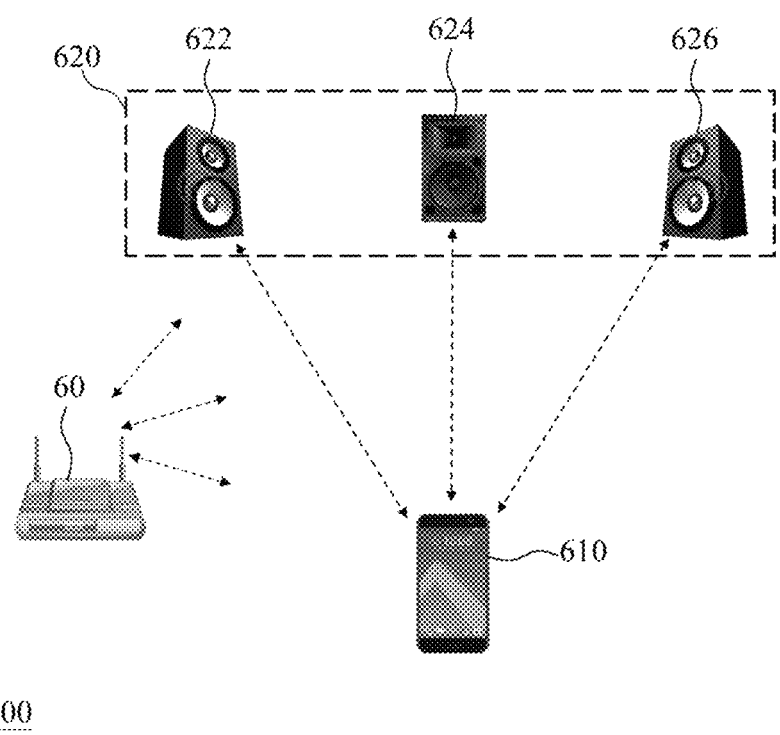
FIG. 6 shows an embodiment of the playback system of the present disclosure.

FIG. 6 shows an embodiment of the playback system of the present disclosure capable of determining the playback role(s) of at least one playback device(s) after its/their position(s) are changed. The playback system 600 of FIG. 6 includes a master device 610 and a plurality of slave devices 620. The master device 610 is a playback control device (e.g., host for the control of audio playback and/or video playback) such as a cellphone, portable computer, wireless acoustic host, or wireless video projector. Each slave device 620 is a playback device (e.g., device for playing music and/or video) such as a cellphone, portable speaker, or monitor. In FIG. 6, the slave devices 620 include three slave devices 622, 624, 626, but this is an example for understanding rather than limitation to the number of the slave devices 620. In view of the demand for implementation, the playback system 600 can be used for processing non-network data (e.g., music/video data of an optical disk, or music/video data of a storage device such as an USB storage device or a memory card) or network data (e.g., music/video data related to an URL). If the playback system 600 is used for processing network data, an embodiment of the playback system 600 is similar to the network data playback system 100/400 of FIG. 1/4 and includes a network circuit (e.g., the network circuit 60) so that the playback system 600 can access network resources through the network circuit. This network circuit can be included in the master device 610 or independent of the master device 610. In light of the above, the network data playback system 100/400 of FIG. 1/4 can be used as the playback system of the present disclosure.

Figure 7:
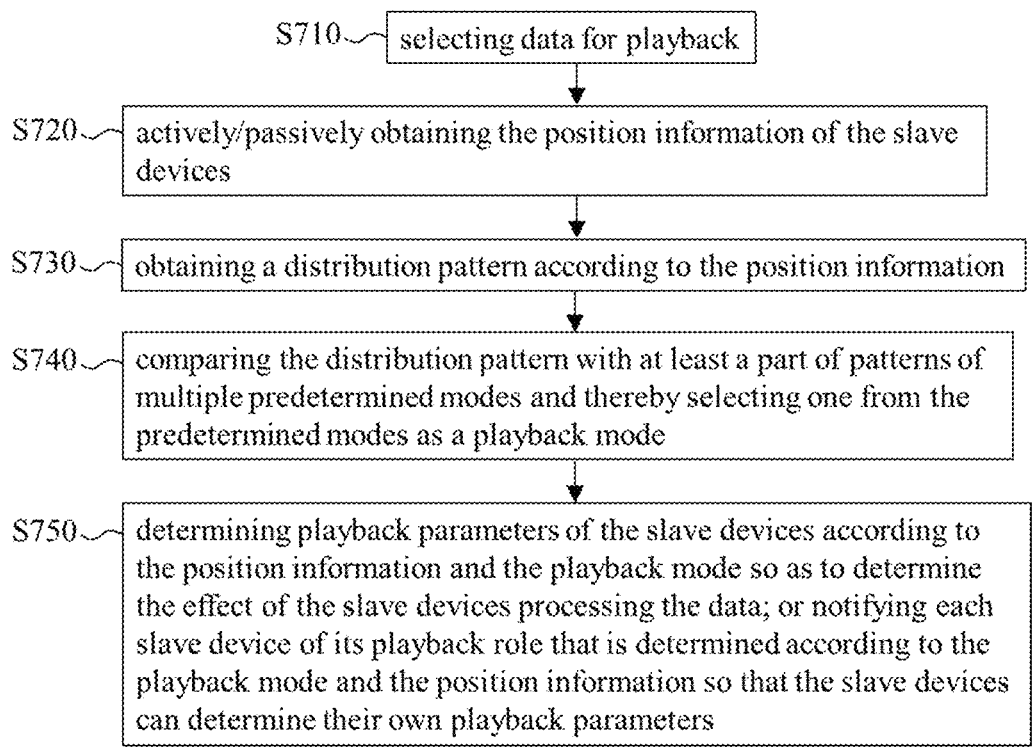
FIG. 7 shows an embodiment of the steps executed by the master device of FIG. 6/8.

Please refer to FIG. 6. The master device 610 is configured to perform a plurality of steps. As shown in FIG. 7, an embodiment of the plurality of steps includes:

Step S710: selecting data for playback. The select data can be non-network data (i.e., data that are not accessed from a network such as the Internet) or network data. On condition that the select data is network data related to an URL, the master device 610 uses a URL to select the data through a network circuit and actively/passively provides the URL for the slave devices 620 so that the slave devices 620 access the data related to the URL through the network circuit and then process the data. The detail of the above features is found in the embodiments of FIGS. 1-5.

Step S720: actively/passively obtaining the position information of the slave devices 620. The position information is determined with a wireless positioning technique and is specific position information or raw data which the master device 610 can process to generate specific position information. Several kinds of positioning techniques are mentioned in the preceding paragraph; other known or self-developed positioning techniques can be used in step S720, if practicable. It should be noted that each slave device 620 includes a wireless communication circuit (e.g., Wi-Fi circuit, BT circuit, UWB circuit, or Radio Frequency Identification (RFID) circuit) generating a wireless signal for the wireless positioning technique. It should also be noted that if the master device 610 itself includes a wireless communication circuit, the position of the master device 610 can optionally be taken into consideration by the wireless positioning technique; in this case, the position information of steps S730~S750 below not only includes the position information of the slave devices 620 but also includes the position information of the master device 610.

Step S730: obtaining a distribution pattern according to the position information. Regarding FIG. 6, the slave devices 622, 624, 626 are respectively at a front-left position, a center position, and a front-right position in comparison with the position of the master device 610. Therefore, the master device 610 can determine the distribution pattern according to the position information (e.g., relative coordinates).

Step S740: comparing the distribution pattern with at least a part of patterns of multiple predetermined modes and thereby selecting one from the predetermined modes as a playback mode. This step can be realized with a known or self-developed pattern recognition technique; for example, one can select a better mode related to the minimum/threshold difference between the distribution pattern and one of the patterns of the predetermined modes or select the better mode according to predetermined setting (e.g., user setting), and then treat this better mode as the playback mode. In an exemplary implementation, the data selected in step S710 is audio data; the predetermined modes include a basic mode (e.g., acoustic mode based on a front-left speaker, front-right speaker, and center speaker), a surrounding mode (e.g., acoustic mode based on a front-left speaker, front-right speaker, center speaker, surrounding-left speaker, and surrounding-right speaker), and an enhanced surrounding mode (e.g., acoustic mode based on a front-left speaker, front-right speaker, center speaker, surrounding-left speaker, surrounding-right speaker, surrounding-rear-left speaker, and surrounding-rear-right speaker); both the distribution pattern and the pattern of each predetermined mode are coordinate information; the master device 610 compares the distribution pattern with at least a part of the patterns of the predetermined modes and learns that the distribution pattern of the slave devices 620 in FIG. 6 is most similar to the pattern of the basic mode; consequently, the master device 610 selects the basic mode as the playback mode.

Step S750: determining playback parameters of the slave devices 620 according to the position information and the playback mode so as to determine the effect of the slave devices 620 processing the data; or notifying each slave device 620 of its playback role that is determined according to the playback mode and the position information so that the slave devices 620 can determine their own playback parameters. For example, the master device 610 determines that the slave devices 622, 624, 626 are a front-left speaker, center speaker, and front-right speaker respectively according to the position information and the basic mode, and thereby determines the playback parameter(s) of the front-left speaker (e.g., using 100% left channel data), playback parameter(s) of the center speaker (e.g., using 50% left channel data and 50% right channel data), and playback parameter(s) of the front-right speaker (e.g., using 100% right channel data). For another example, the master device 610 informs the slave devices 622, 624, 626 of their playback roles being a front-left speaker, center speaker, and front-right speaker respectively so that each of the slave devices 622, 624, 626 can determine its own playback parameter(s) with one or more algorithm(s) in light of its role. For yet another example, the playback parameter(s) of one slave device 620 is different from the playback parameter(s) of another slave device 620. It should be noted that the master device 610 can optionally control all the slave devices 620 to play synchronously/asynchronously to create listening/watching experience.

Figure 8:
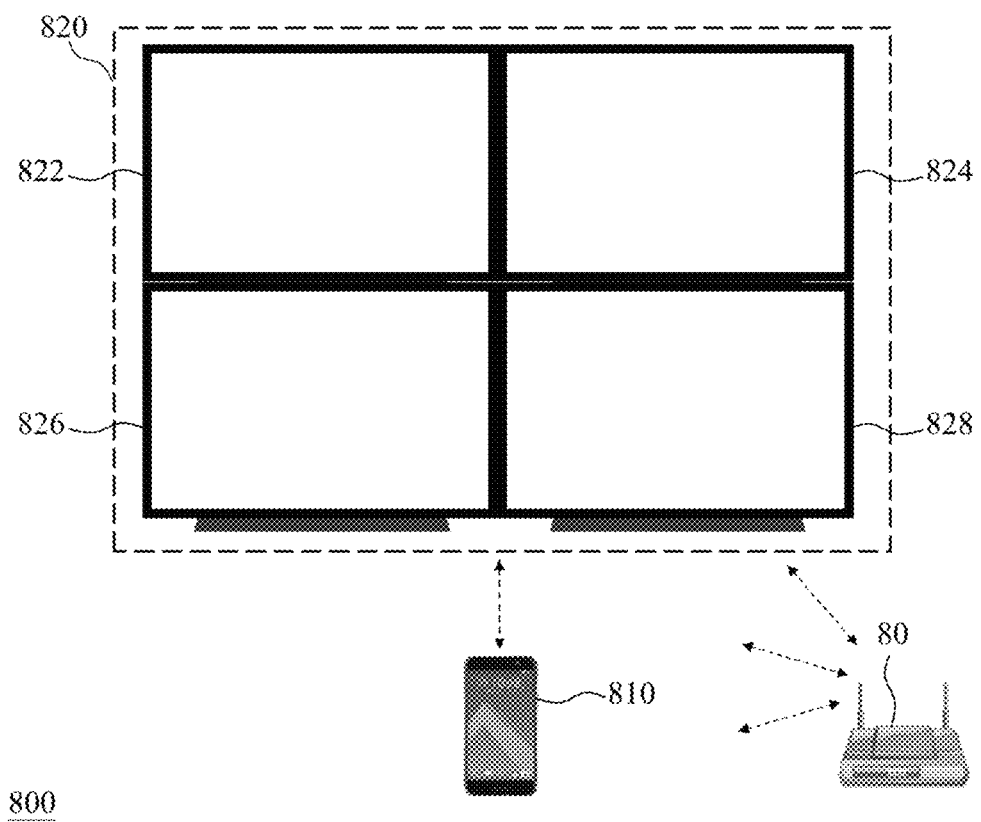
FIG. 8 shows another embodiment of the playback system of the present disclosure.

FIG. 8 shows another embodiment of the playback system of the present disclosure. The playback system 800 of FIG. 8 includes a master device 810 and a plurality of slave devices 820. The slave devices 820 include a slave device 822, slave device 824, and slave device 828. The master device 810 is configured to perform a plurality of steps; an embodiment of the plurality of steps includes the steps of FIG. 7. Providing "the data selected by step S710 includes image/video data", "the position information obtained by step S720 shows that the positions of the slave device 822, slave device 824, slave device 826, and slave device 828 are the upper-left position, upper-right position, lower left position, and lower right position respectively", "the distribution pattern obtained by step S730 is a 2 by 2 pattern", and "the predetermined modes of step S740 include a 2 by 2 mode (e.g., display mode based on an upper left monitor, upper right monitor, lower left monitor, and lower right monitor) and a 3 by 3 mode (e.g., display mode based on an upper left monitor, upper center monitor, upper right monitor, left monitor, center monitor, right monitor, lower left monitor, lower center monitor, and lower right monitor)", step S740 can compare the distribution pattern with at least a part of the patterns of the predetermined modes to find out that the distribution pattern of the slave devices 820 in FIG. 8 is most similar to the 2 by 2 pattern and thereby use the 2 by 2 mode as the playback mode. Afterward, step S750 makes the slave devices 822, 824, 826, 828 process the upper left quarter of the image/video data, the upper right quarter of the image/video data, the lower left quarter of the image/video data, and the lower right quarter of the image/video data respectively. It should be noted that if the playback system 800 of FIG. 8 is configured to process network data, the playback system 800 will include a network circuit (e.g., the network circuit 80 of FIG. 8) to access network resources through the network circuit. This network circuit can be included in the master device 810 or independent of the master device 810.

Figure 9:
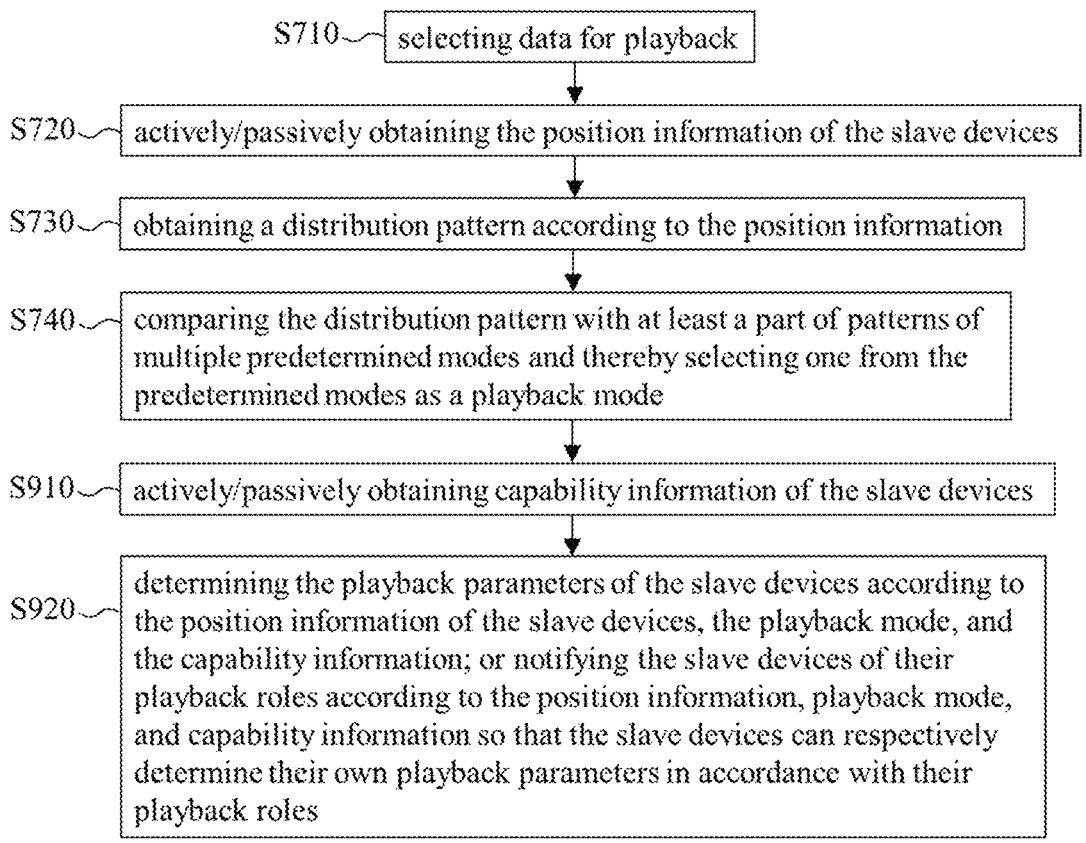
FIG. 9 shows another embodiment of the steps executed by the master device of FIG. 6/8.

Please refer to FIG. 6/8. In another embodiment, the master device 610/810 executes a plurality of steps, as shown in FIG. 9, including the aforementioned steps S710~S740 and the following steps:

Step S910: actively/passively obtaining capability information of the slave devices 620/820. Examples of the capability information are described in the preceding paragraph.

Step S920: determining the playback parameters of the slave devices 620/820 according to the position information of the slave devices 620/820, the playback mode, and the capability information; or notifying the slave devices 620/720 of their playback roles according to the position information, playback mode, and capability information so that the slave devices 620/720 can respectively determine their own playback parameters in accordance with their playback roles. For example, if the master device 610 learns that the low frequency response (e.g., frequency response corresponding to the frequencies below 300 Hz) of the slave device 624 is better than those of the other slave devices 620, the master device 610 can designate the slave device 624 as a subwoofer. For another example, if the master device 810 learns that all the slave devices 820 have the same 4K resolution display capability (e.g., 3840×2160 or 4096×2160) but have different decoding capabilities (e.g., the slave device 828 is capable of decoding two 4K-code streams while the other slave devices 822, 824, 826 are only capable of decoding one 4K-code stream), the master device 810 can select a URL providing image/video data and then make the slave device (e.g., the slave device 828) having a higher decoding capability process the image/video data of higher resolution (e.g., 4KP120, picture in picture (PIP), etc.) and the other slave device (e.g., the slave devices 822, 824, 826) process the image/video data of lower resolution.

Please refer to FIG. 6/8. In yet another embodiment, the master device 610/810 executes a plurality of steps including steps S710~S750 of FIG. 7 and steps S1010~S1040 of FIG. 10 as follows:

Step S1010: actively/passively updating the position information of the slave devices 620/820 with a wireless positioning technique and thereby obtaining updated position information. According to the demand for implementation, step S1010 can optionally include: actively/passively obtaining the position information of a new slave device through the wireless positioning technique and thereby obtaining the updated position information, wherein the new slave device participated in the playback system 600/800 and is controlled by the master device 610/810. It should be noted that if the position information of some slave device(s) 620/820 is not accessible, step S1010 will obtain the updated position information according to the position information of the other slave device(s) 620/820. In an exemplary implementation, if two slave devices join the playback system 600 of FIG. 6 and are set at the left and right positions respectively, the master device 610 can obtain the updated position information according to the position information of the preexistent slave devices 620/820 and the two new slave devices, and thereby select the aforementioned surrounding mode as the playback mode and determine the playback parameter(s) of each slave device; if the two new slave devices are removed out of the playback system 600, the master device 610 can obtain the updated position information according to the position information of the remaining slave devices 620/820, and thereby select the aforementioned basic mode as the playback mode and determine the playback parameter(s) of each slave device. In another exemplary implementation, if the positions of the slave devices 822, 824 of FIG. 8 are exchanged, the master device 810 can obtain the updated information accordingly and make the slave devices 822, 824 process the upper right quarter of the image/video data and the upper left quarter of the image/video data respectively.

Step S1020: obtaining an updated distribution pattern according to the updated position information.

Step S1030: comparing the updated distribution pattern with at least a part of the patterns of the predetermined modes and thereby selecting one from the predetermined modes as an updated playback mode.

Step S1040: determining playback parameters of the slave devices 620/820 according to the updated position information and the updated playback mode; or notifying each slave device 620/820 of its playback role that is determined according to the updated playback mode and the updated position information so that the slave devices 620/820 can determine their own playback parameters.

Figure 10:
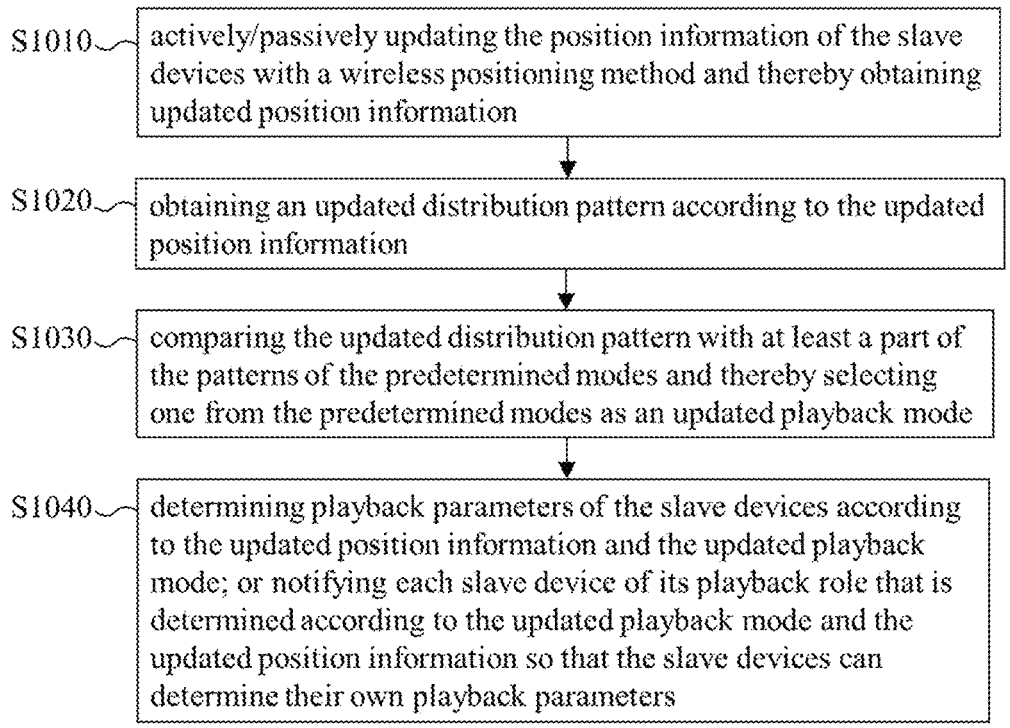
FIG. 10 shows an embodiment of the steps optionally executed by the master device of FIG. 6/8.

Since those of ordinary skill in the art can refer to the disclosure of the embodiments of FIGS. 6-9 to appreciate the detail and modification of the embodiment of the FIG. 10, repeated and redundant description is omitted here.

Figure 11:
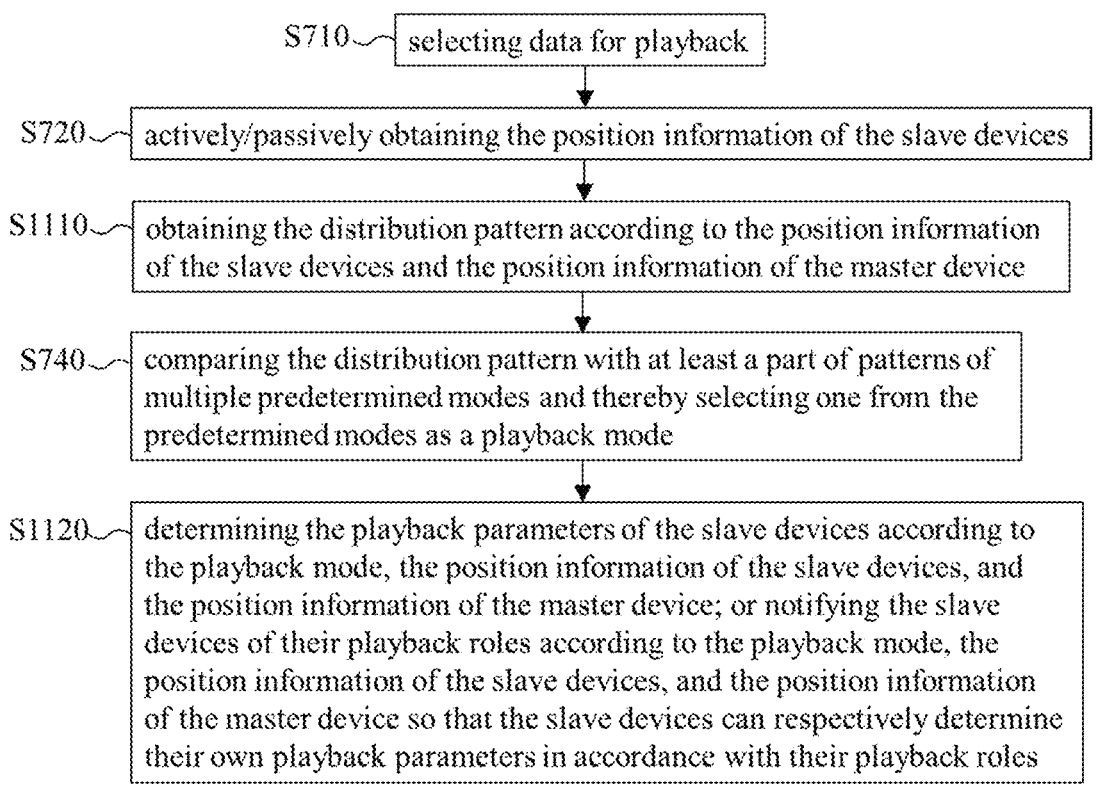
FIG. 11 shows yet another embodiment of the steps executed by the master device of FIG. 6/8.

Please refer to FIG. 6/8. In yet another embodiment, the master device 610/810 executes a plurality of steps, as shown in FIG. 11, including the aforementioned steps S710~S720 and S740 and the following steps:

Step S1110: obtaining the distribution pattern according to the position information of the slave devices 620/820 and the position information of the master device 610/810. In this embodiment, the master device 610/810 includes a wireless circuit generating a wireless signal for determining the position of the master device 610/810 with the aforementioned wireless positioning technique.

Step S1120: determining the playback parameters of the slave devices 620/820 according to the playback mode, the position information of the slave devices 620/820, and the position information of the master device 610/810; or notifying the slave devices 620/720 of their playback roles according to the playback mode, the position information of the slave devices 620/820, and the position information of the master device 610/810 so that the slave devices 620/820 can respectively determine their own playback parameters in accordance with their playback roles. In an exemplary implementation, the master device 610/810 itself functions as a playback device in the playback system 600/800 and thus its position is taken into consideration for determining the distribution pattern and the playback mode. In another exemplary implementation, since the position of the master device 610/810 is usually close to the position of the user no matter whether the master device 610/810 functions as a playback device or not, the playback parameters of the slave devices 620/820 are determined in view of the position of the master device 610/810 to create better listening/watching experience.

Figure 12:
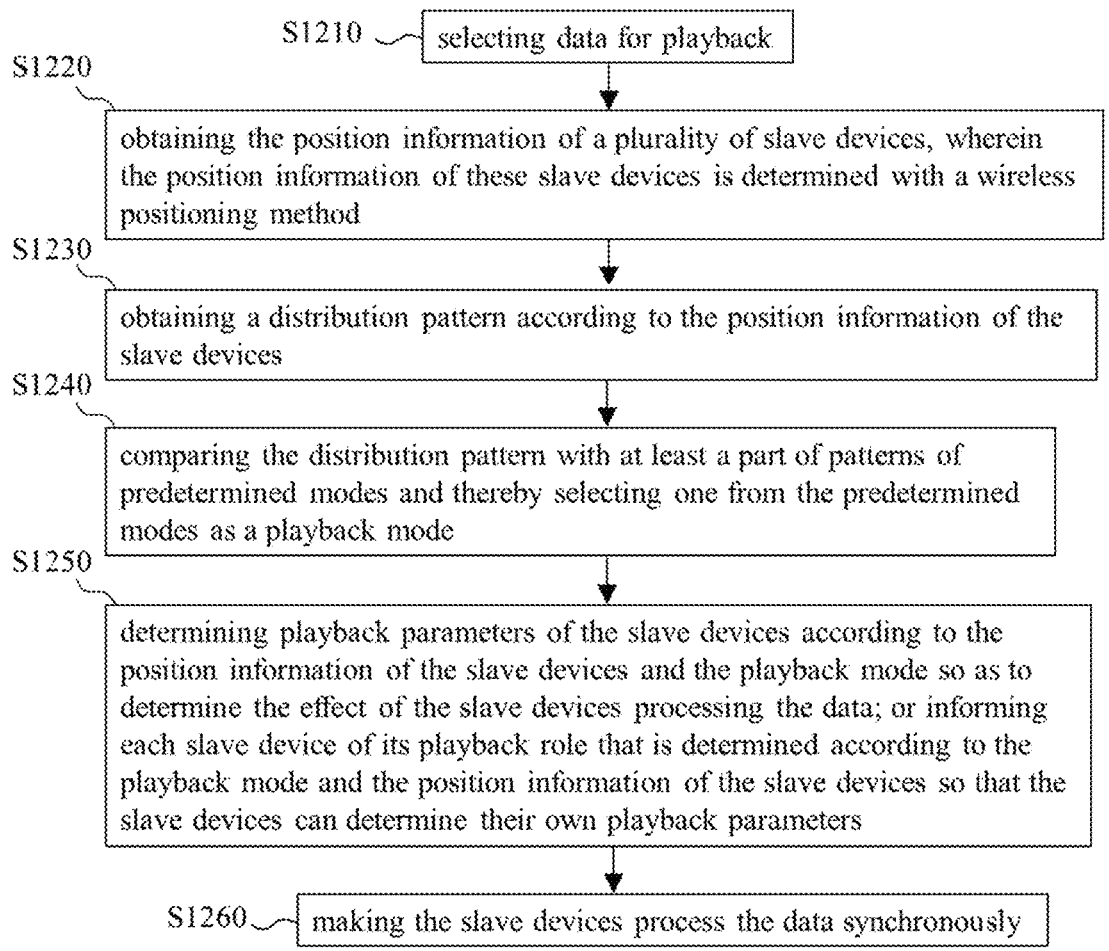
FIG. 12 shows an embodiment of the playback method of the present disclosure.

FIG. 12 shows an embodiment of the playback method of the present disclosure. This embodiment is carried out by a master device (e.g., the master device 610/810 of FIG. 6/8) and includes the following steps:

Step S1210: selecting data for playback.

Step S1220: actively/passively obtaining the position information of a plurality of slave devices, wherein the position information of these slave devices is determined with a wireless positioning technique.

Step S1230: obtaining a distribution pattern according to the position information of the slave devices.

Step S1240: comparing the distribution pattern with at least a part of patterns of multiple predetermined modes and thereby selecting one from the predetermined modes as a playback mode.

Step S1250: determining playback parameters of the slave devices according to the position information of the slave devices and the playback mode so as to determine the effect of the slave devices processing the data; or notifying each slave device of its playback role that is determined according to the playback mode and the position information of the slave devices so that the slave devices can determine their own playback parameters.

Step S1260: making the slave devices process the data synchronously.

Since those having ordinary skill in the art can refer to the disclosure of the embodiments of FIGS. 6-11 to appreciate the detail and modifications of the embodiment of FIG. 12, repeated and redundant description is omitted here.

It should be noted that the term "playback" here means not only "the act of listening to or watching something that was previously recorded" but also "the act of listening to or watching something that is broadcasted online or in real-time". It should also be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly based on the present disclosure.

To sum up, the network data playback system and method of the present disclosure can let a playback device try to continue processing data related to an original URL after this playback device is out of an original network range; and the playback system and method of the present disclosure can adaptively adjust the playback role(s) of one or more playback device(s) after the position(s) of the one or more playback device(s) is/are changed.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A playback system, comprising:
a master device configured to perform a plurality of steps including:
    selecting data for playback;
    obtaining position information of slave devices, wherein the position information of the slave devices is determined with a wireless positioning technique;
    obtaining a distribution pattern according to the position information of the slave devices;
    comparing the distribution pattern with at least a part of patterns of predetermined modes and thereby selecting one from the predetermined modes as a playback mode;
    obtaining capability information of the slave devices, wherein the capability information includes at least one of a decoding capability and a playback capability, and the playback capability includes at least one of an Extended Display Identification Data version 2.0 (EDID 2.0) and frequency response information; and
    determining playback parameters of the slave devices according to the position information of the slave devices and the playback mode so as to determine an effect of the slave devices processing the data, or notifying each of the slave devices of its playback role that is determined according to the playback mode and the position information of the slave devices so that each of the slave devices determine its own playback parameter(s);
    obtaining the position information of the slave devices with the wireless positioning technique and thereby obtaining updated position information, wherein the updated position information is obtained with position updating steps including: on condition that position information of a part of the slave devices is not accessible, obtaining the updated position information according to position information of the other part of the slave devices;
    obtaining an updated distribution pattern according to the updated position information;
    comparing the updated distribution pattern with at least a part of the patterns of the predetermined modes and thereby selecting one from the predetermined modes as an updated playback mode; and determining the playback parameters of the slave devices according to the updated position information and the updated playback mode, or notifying each of the slave devices of its playback role that is determined according to the updated playback mode and the updated position information so that each of the slave devices determines its own playback parameter(s); and the slave devices, wherein each of the slave devices includes a wireless communication circuit available to the wireless positioning technique, and the slave devices process the data synchronously according to the master device's control.

2. The playback system of claim 1, wherein the wireless positioning technique is an indoor wireless positioning technique.

3. The playback system of claim 1, wherein the plurality of steps further include: using a Uniform Resource Locator (URL) to select the data through a network circuit; and providing the URL for the slave devices so that the slave devices access the data related to the URL through the network circuit and then process the data.

4. The playback system of claim 3, wherein the network circuit is included in the master device.

5. The playback system of claim 1, wherein the playback parameter(s) of a first slave device of the slave devices is different from the playback parameter(s) of a second slave device of the slave devices.

6. The playback system of claim 5, wherein the step of determining the playback parameters of the slave devices includes: determining the playback parameters of the slave devices according to the position information of the slave devices, the playback mode, and the capability information; or notifying each of the slave devices of its playback role that is determined according to the position information, the playback mode, and the capability information.

7. The playback system of claim 1, wherein playback parameter(s) of one of the slave devices is/are different from playback parameter(s) of another one of the slave devices.

8. The playback system of claim 1, wherein
the step of obtaining the distribution pattern includes:
obtaining the distribution pattern according to the position information of the slave devices and position information of the master device; and
the step of determining the playback parameters of the slave devices includes:
determining the playback parameters of the slave devices according to the playback mode, the position information of the slave devices, and the position information of the master device; or notifying each of the slave devices of its playback role that is determined according to the playback mode, the position information of the slave devices, and the position information of the master device so that each of the slave devices determines its own playback parameter(s).

9. The playback system of claim 1, wherein the slave devices determine the playback parameters on their own according to a same algorithm.

10. A playback method carried out by a master device, comprising:
selecting data for playback;
obtaining position information of slave devices, wherein the position information of the slave devices is determined with a wireless positioning technique;
obtaining a distribution pattern according to the position information of the slave devices;
comparing the distribution pattern with at least a part of patterns of predetermined modes and thereby selecting one from the predetermined modes as a playback mode;
determining playback parameters of the slave devices according to the position information of the slave devices and the playback mode so as to determine an effect of the slave devices processing the data, or notifying each of the slave device of its playback role that is determined according to the playback mode and the position information of the slave devices;
controlling the slave devices to process the data synchronously;
obtaining the position information of the slave devices with the wireless positioning technique and thereby obtaining updated position information;
obtaining an updated distribution pattern according to the updated position information;
comparing the updated distribution pattern with at least a part of the patterns of the predetermined modes and thereby selecting one from the predetermined modes as an updated playback mode; and
determining the playback parameters of the slave devices according to the updated position information and the updated playback mode, or notifying each of the slave devices of its playback role that is determined according to the updated playback mode and the updated position information so that each of the slave devices determines its own playback parameter(s),
wherein the updated position information is obtained with position updating steps including:
on condition that position information of a part of the slave devices is not accessible, obtaining the updated position information according to position information of the other part of the slave devices.

* * * * *